United States Patent
Bayle et al.

(10) Patent No.: US 12,438,846 B2
(45) Date of Patent: Oct. 7, 2025

(54) OPEN WORLD COMMUNICATION DEVICE FOR COMMUNICATING WITH AN AVIONICS SYSTEM, ASSOCIATED COMMUNICATION SYSTEM AND COMMUNICATION METHOD

(71) Applicant: THALES, Courbevoie (FR)

(72) Inventors: Pierre Bayle, Toulouse (FR); Olivier Balard, Toulouse (FR); Aurélie Garcia, Toulouse (FR); André Cleroux, Toulouse (FR); Clara Lopez, Toulouse (FR)

(73) Assignee: THALES, Courbevoie (FR)

( * ) Notice: Subject to any disclaimer, the term of this patent is extended or adjusted under 35 U.S.C. 154(b) by 234 days.

(21) Appl. No.: 17/911,918

(22) PCT Filed: Mar. 16, 2021

(86) PCT No.: PCT/EP2021/056701
§ 371 (c)(1),
(2) Date: Sep. 15, 2022

(87) PCT Pub. No.: WO2021/185846
PCT Pub. Date: Sep. 23, 2021

(65) Prior Publication Data
US 2023/0140117 A1    May 4, 2023

(30) Foreign Application Priority Data
Mar. 16, 2020   (FR) ........................... 2002545

(51) Int. Cl.
*H04L 9/40*    (2022.01)
*G06F 21/53*   (2013.01)
(Continued)

(52) U.S. Cl.
CPC .......... *H04L 63/0245* (2013.01); *G06F 21/53* (2013.01); *G08G 5/21* (2025.01);
(Continued)

(58) Field of Classification Search
CPC . H04L 63/0245; H04L 63/1441; G06F 21/53; G08G 5/0021; G08G 5/0039; G08G 5/0052
See application file for complete search history.

(56) References Cited

U.S. PATENT DOCUMENTS

| 10,295,349 | B2 | 5/2019 | Mere | |
| 2006/0059543 | A1* | 3/2006 | Knowles | ................ H04L 63/08 726/4 |
| 2019/0311632 | A1* | 10/2019 | Hochwarth | .......... G08G 5/0013 |

FOREIGN PATENT DOCUMENTS

| EP | 3 413 200 | 12/2018 |
| EP | 3 553 764 | 10/2019 |

OTHER PUBLICATIONS

International Search Report dated May 6, 2021, for PCT/EP2021/056701, 5 pp., including English translation.
(Continued)

*Primary Examiner* — Ayoub Alata
(74) *Attorney, Agent, or Firm* — NIXON & VANDERHYE

(57) ABSTRACT

Disclosed is an open world communication device with an aircraft avionics system including an application component. The device further includes an interfacing component with a communication module able to intercept each request sent by the application component and a clone of the avionics system able to test each request intercepted by the communication module in order to determine the status of the request between a conforming status and a non-conforming status. The communication module is able to send to the
(Continued)

avionics system, only the requests having the conforming status.

19 Claims, 4 Drawing Sheets

(51) Int. Cl.
*G08G 5/21* (2025.01)
*G08G 5/34* (2025.01)
*G08G 5/53* (2025.01)
*G08G 5/55* (2025.01)

(52) U.S. Cl.
CPC ................ *G08G 5/34* (2025.01); *G08G 5/53* (2025.01); *G08G 5/55* (2025.01); *H04L 63/1441* (2013.01)

(56) References Cited

OTHER PUBLICATIONS

Written Opinion of the ISA dated May 6, 2021, for PCT/EP2021/056701, 9 pp., including English translation.
French Search Report dated Nov. 5, 2020, for French Application No. 2002545, 2 pp.

* cited by examiner

OPEN WORLD COMMUNICATION DEVICE FOR COMMUNICATING WITH AN AVIONICS SYSTEM, ASSOCIATED COMMUNICATION SYSTEM AND COMMUNICATION METHOD

CROSS-REFERENCE TO RELATED APPLICATION(S)

This application is the U.S. national phase of International Application No. PCT/EP2021/056701 filed Mar. 16, 2021 which designated the U.S. and claims priority to FR 2002545 filed Mar. 16, 2020, the entire contents of each of which are hereby incorporated by reference.

BACKGROUND OF THE INVENTION

Field of the Invention

The present invention relates to an open world communication device.

The present invention further relates to a communication system and a communication method associated with the open world communication device.

The invention is applicable in particular to an avionics system with a flight management system.

Description of the Related Art

In the field of aeronautics, a flight management system, known by the term "FMS", is an important aircraft system through which the pilot can enter flight data to be followed, such as e.g. a flight plan, a point of arrival, waypoints, etc.

Thus, such an FMS can be used, as is known per se, for planning a flight and in particular for predicting a trajectory to be followed by the aircraft, and all the data associated with the trajectory such as e.g. flight time, consumption, etc.

In this way, e.g. an autopilot system can control the trajectory defined by the FMS in order to automatically guide the aircraft along the trajectory.

An FMS is generally associated with a display screen and with entering means allowing the pilot to enter data into such system. The data resulting from the calculations performed by the FMS can then be displayed on the screen and/or sent to other systems.

The FMS is a part of avionics systems and has a so-called closed world system for this purpose.

Often, to enter data into the FMS, the pilot uses other electronic devices which are not part of the closed world. By contrast, such devices are thus called open world devices.

This means in particular that such devices do not follow the same certification rules as closed world devices and, hence that same do not have the same level of integrity and of security as the closed world devices.

Among the open world devices the pilot can use, an electronic device called "Electronic Flight Bag" or "EFB", is known in particular.

Such a device is e.g. in the form of an electronic tablet or any other portable electronic device, and allows the pilot in particular to perform a certain number of calculations relating to the flight plan to be followed.

The EFB system can be further used for keeping flight procedures and other useful information.

In order to avoid any interaction of open world devices with avionics systems, pilots generally manually enter data coming from e.g. the EFB device, into the FMS or more generally into any other avionics system.

However, in order to make a pilot work fluid, to reduce workload for pilots and to reduce the risk of errors, it is desirable to be able to directly connect at least some of the open world devices to avionics systems such as, in particular, the flight management system (FMS).

In the prior art, a few solutions can already be used for at least partially providing a connection between open world devices and avionics systems such as, in particular, the FMS.

Such solutions in particular use many filtering systems making it possible to filter each request sent by an open world device to the FMS.

However, existing systems do not give full satisfaction because same have relatively complex structures to set up and because same do not make it possible to completely avoid requests which could possibly be malicious.

SUMMARY OF THE INVENTION

The purpose of the present invention is to overcome such drawbacks and thus to propose an open-world device for communicating directly with an avionics system without the need to introduce a complex structure, while at the same time providing a high level of safety.

To this end, the subject matter of the invention is an open world communication device with an avionics system of an aircraft, comprising an application component able to send requests to the avionics system and to receive data from the avionics system.

The device is characterized in that same further comprises an interfacing component comprising a communication module able to intercept each request sent by the application component and a clone of the avionics system able to test each request intercepted by the communication module in order to determine a status of the request between a conforming and a non-conforming status.

the communication module being able to send to the avionics system, only the requests having the conforming status.

According to other advantageous aspects of the invention, the open world device method comprises one or more of the following characteristics, taken individually or according to all technically possible combinations:

the communication module being further able to send to the application component, an error message for each request having the non-conforming status;

the interfacing component further comprising an authentication module able to authenticate the application component so as to authorize same to send requests to the avionics system;

the data emitted by the avionics system being in the form of a data stream which is broadcast by such system and wherein the interfacing component is able to directly send said data stream to the application component;

the communication module being able to send to the avionics system, the corresponding requests in an encrypted form;

the interfacing component being the only component of the device connected to the avionics system;

the interfacing component being in the form of an application;

the clone being in the form of a software-clone of the avionics system;

the clone determining the status of a request as non-conforming when at least one of the conditions selected from the group consists of:

the number of requests sent in a predetermined time interval not being compatible with the processing capacity of the clone;

the format of the request not corresponding to an expected format;

the execution of the request leading to unexpected data;

the request not being allowed to be executed by the aircraft avionics system without endangering the passengers thereof;

is met;

the communication module being able to block the application component when at least one request sent by the component has the non-conforming status;

the device comprising a plurality of application components, each application component being able to send requests to the avionics system via the interfacing component and to receive data from the avionics system;

the avionics system being a flight management system.

The invention further relating to a communication system for an aircraft, comprising:

an avionics system;

an open world device for communicating with the avionics system, the device being as defined above.

According to other advantageous aspects of the invention, the communication system further comprises an interface connecting the open world device to the avionics system.

The invention further relates to a method for communicating with an avionics system of an aircraft, implemented by an open world communication device as defined above;

the method comprising the following steps:

generating a request intended for the avionics system;

intercepting said request;

testing said request intercepted by the communication module so as to determine a status of such request between a conforming status and a non-conforming status;

when said request has the conforming status, sending the request to the avionics system.

BRIEF DESCRIPTION OF THE DRAWINGS

The characteristics and advantages of the invention will appear upon reading the following description, given only as a non-limiting example, and making reference to the drawings annexed thereto, wherein.

DETAILED DESCRIPTION OF THE INVENTION

Figure 1:
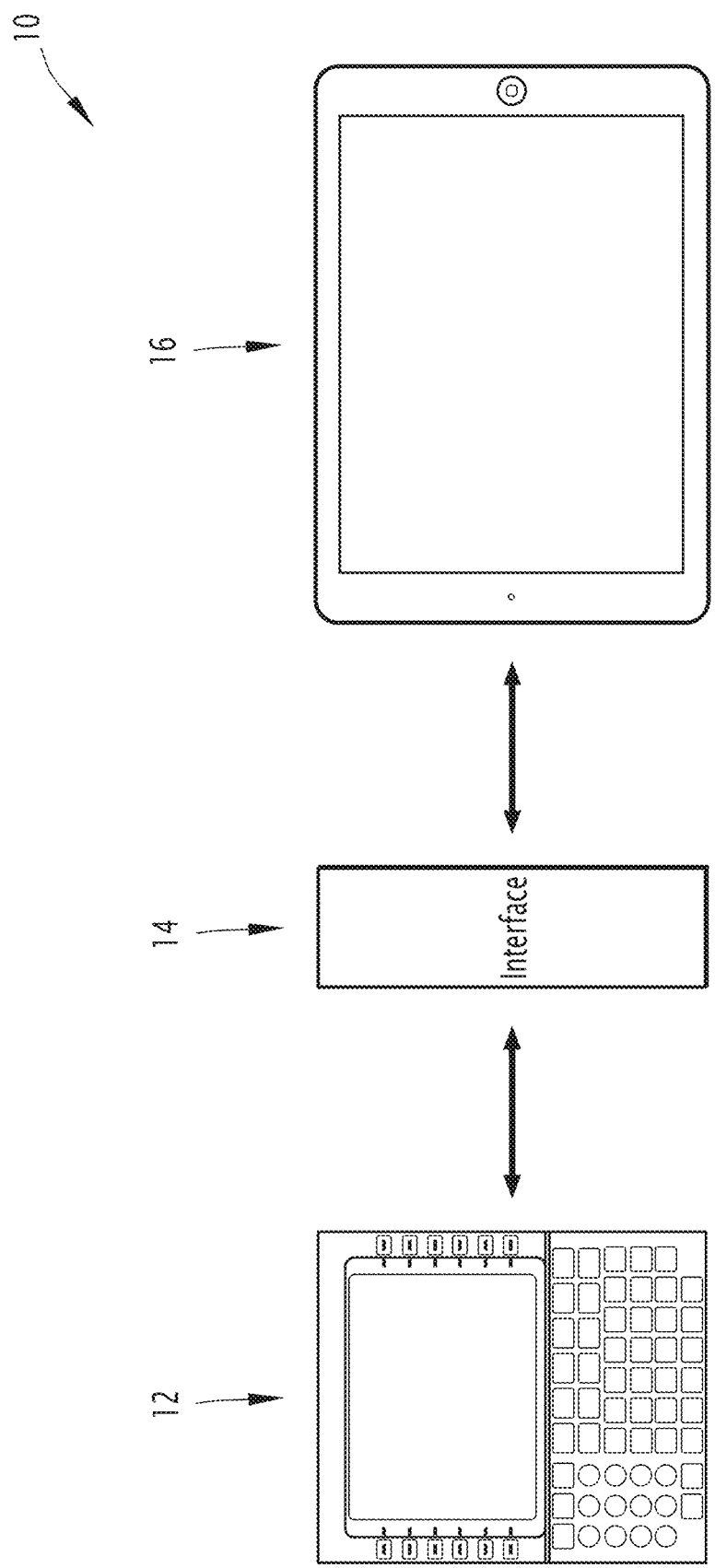
FIG. 1 is a schematic view of a communication system according to the invention, the communication system comprising in particular, an open world communication device according to the invention.

FIG. 1 shows a communication system 10 for an aircraft.

Aircraft refers in particular to an airplane or a helicopter, or a drone, or further any other flying craft the piloting of which is performed at least partially using an avionics system as described below, by at least one pilot. Such an avionics system can be directly taken aboard into the aircraft or can be remote from the aircraft. In the latter case, the piloting of the aircraft is also performed e.g. remotely.

As can be seen in FIG. 1, the communication system 10 comprises an avionics system 12, an interface 14 and an open world communication device 16.

The avionics system is in particular, a flight management system 12 known by the term FMS. The system 12 will hereinafter be referred to as the FMS 12.

As is known per se, the FMS 12 can be used for calculating in particular, a trajectory of the aircraft and predicting data related to the trajectory, starting from the data entered by the pilot. Such data are entered in particular, in the form of requests from the open world device 16, as will be explained hereinafter.

The FMS 12 can further generate data intended e.g. for another avionics system and/or for the pilot and/or for the open world communication device 16. Such data is subsequently called the flight management data.

The FMS 12 is coupled in particular, to one or a plurality of display screens and to means of entering data such as e.g. a keyboard.

As is also known per se, the FMS 12 can be doubled by another flight management system associated e.g. with another pilot.

The interface 14 can be used for connecting the open world communication device 16 to the FMS 12.

The interface 14 has e.g. a gateway connected by wire to the FMS 12 and wirelessly to the open world communication device 16.

In some embodiments, the interface 14 further has a support serving as a base for the open world communication device 16.

Thus, in such a case, the open-world device 16 can e.g. be placed on the support e.g. for being charged and for being connected by wire to the FMS 12. When the open-world device 16 is removed from such support, the device 16 can e.g. be connected to same wirelessly, using one of the wireless data transmission protocols as known per se.

The open world device 16 has e.g. a tablet or any other portable electronic device such as a e.g. a smartphone configured for being used by the pilot for communicating with the FMS 12.

In general, the open-world device 16 can have the functions of an electronic device known in the prior art under the name "Electronic Flight Bag" or "EFB".

In particular, the open world device 16 allows the pilot to perform at least certain calculation-related operations during the preparation of a flight plan.

The open world communication device 16 will henceforth be explained in greater detail with reference to FIG. 2.

Figure 2:
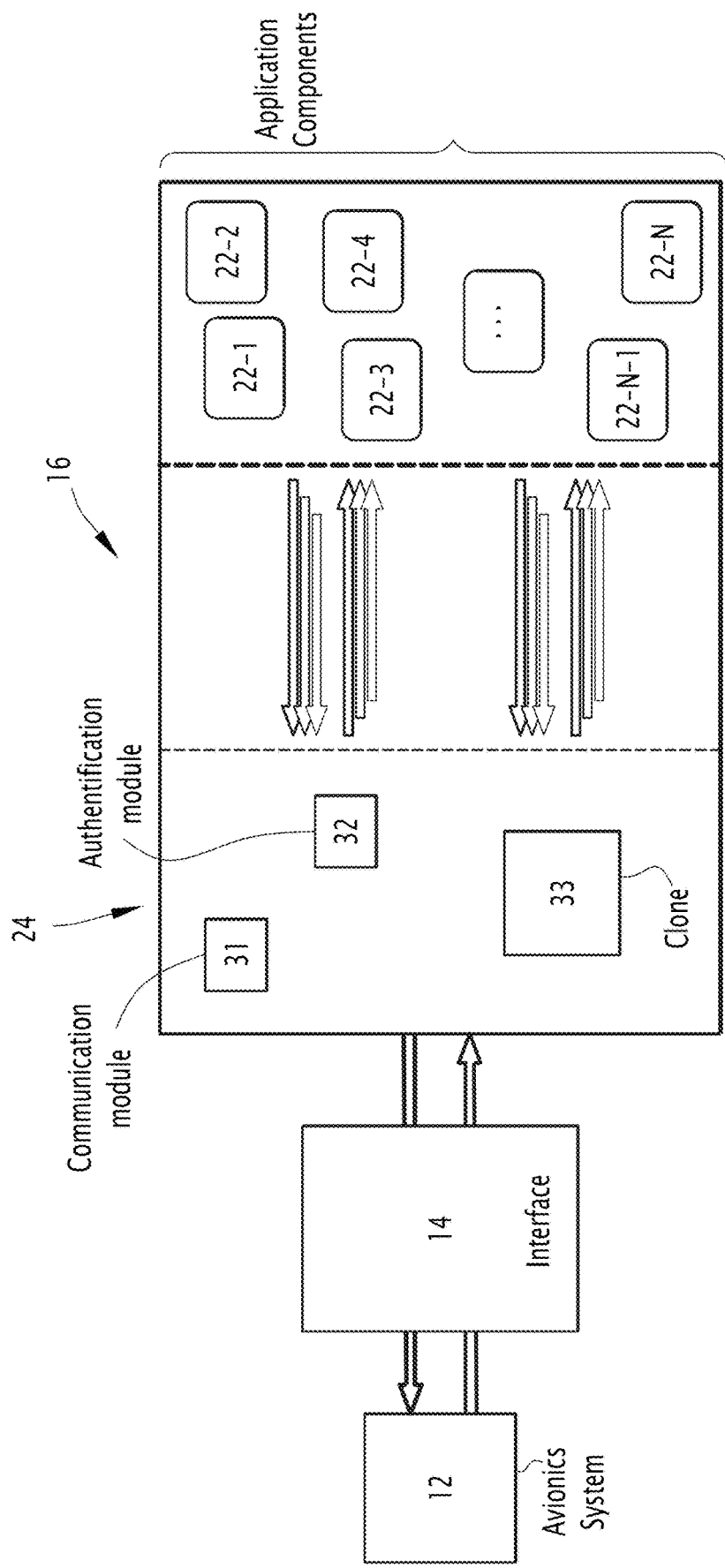
FIG. 2 is a detailed schematic view of the open world communication device shown in FIG. 1.

Thus, as illustrated in FIG. 2, the open world device 16 comprises a plurality of application components 22-1 to 22-N and an interfacing component 24 enabling each of the application components 22-1 to 22-N to be connected via the interface 14 to the FMS 12.

The open world device 16 further comprises components known per se (not shown in FIG. 2) such as a processor, a memory, a screen, entering means, etc.

Each of the application components 22-1 to 22-N has e.g. an application which is stored in the memory of the open world device 16 and can be used for implementing at least certain functions which can be used by the pilot in relation to the FMS 12.

Thus, each of the application components 22-1 to 22-N makes it possible to generate requests to be sent to the FMS 12 and to receive flight management data from this FMS 12.

To connect each of the application components 22-1 to 22-N to the FMS, the application component 24 comprises a communication module 31, an authentication module 32 and a clone 33 of the FMS 12.

The application component 24 is in particular in the form of one or a plurality of software programs, or at least partially in the form of a programmable logic circuit, e.g. an FPGA (Field-Programmable Gate Array).

The communication module 31 makes it possible to intercept each request coming from each application component 22-1 to 22-N in order to send same to the clone 33.

The communication module 31 also makes it possible to encrypt the requests having the conforming status and to send same to the FMS module 12.

Finally, the communication module 31 makes it possible to reject or to send back to the corresponding application component, each request having the non-conforming status, as will be explained hereinafter.

The authentication module 32 authenticates each of the application components from 22-1 to 22-N so that the application component can communicate with the interface component 24.

To this end, the authentication module 32 comprises e.g. a database for identifying all the application components authorized to communicate with the FMS 12.

According to another example of embodiment, the authentication module 32 is able to implement a specific analysis of each application components in order to either deliver or not deliver to the application component, the authorization to communicate with the FMS 12.

The clone 33 makes it possible to autonomously reproduce the operation of the FMS 12. To this end, the clone 33 is e.g. in the form of a software-clone of the FMS 12.

In other words, the clone 33 is able to model the operation of the FMS 12.

Furthermore, the clone 33 is able to receive each request intercepted by the communication module 31 in order to determine the conformity thereof.

In particular, the clone 33 makes it possible to determine a status of each intercepted request between a conforming status and a non-conforming status.

The conforming status is associated with the intercepted request when the execution thereof would lead to the normal operation of the FMS 12 according to the modeling performed by the clone 33.

The non-conforming status is associated with each intercepted request when the execution thereof would lead, according to the modeling performed by the clone 33, to the abnormal operation of the FMS 12 or to at least one abnormal resultant datum.

In particular, the non-conforming status is associated with an intercepted request when at least one of the conditions selected from the group comprising:
- the number of requests sent in a predetermined time interval is not compatible with the processing capacity of the clone 33;
- the format of the request does not correspond to an expected format;
- the execution of the request leads to unexpected data, in particular according to the current context of the flight of the aircraft;
- the flight plan intended to be sent to the FMS 12 cannot to be executed by the aircraft without endangering the passengers thereof.

is met.

In particular, it is clear e.g. that when a request leads to a destabilization of the normal FMS operation according to the modeling performed by the clone 33, the non-conforming status is associated with the request.

According to yet another example, when a request leads to performance data outside the capabilities of the aircraft, the request is also associated with the non-conforming status.

When a request is associated with the non-conforming status, the communication module 31 is able to send back the request to the application component which generated same, with an error message.

The error message can e.g. comprise a complete report on the request.

Figure 3:
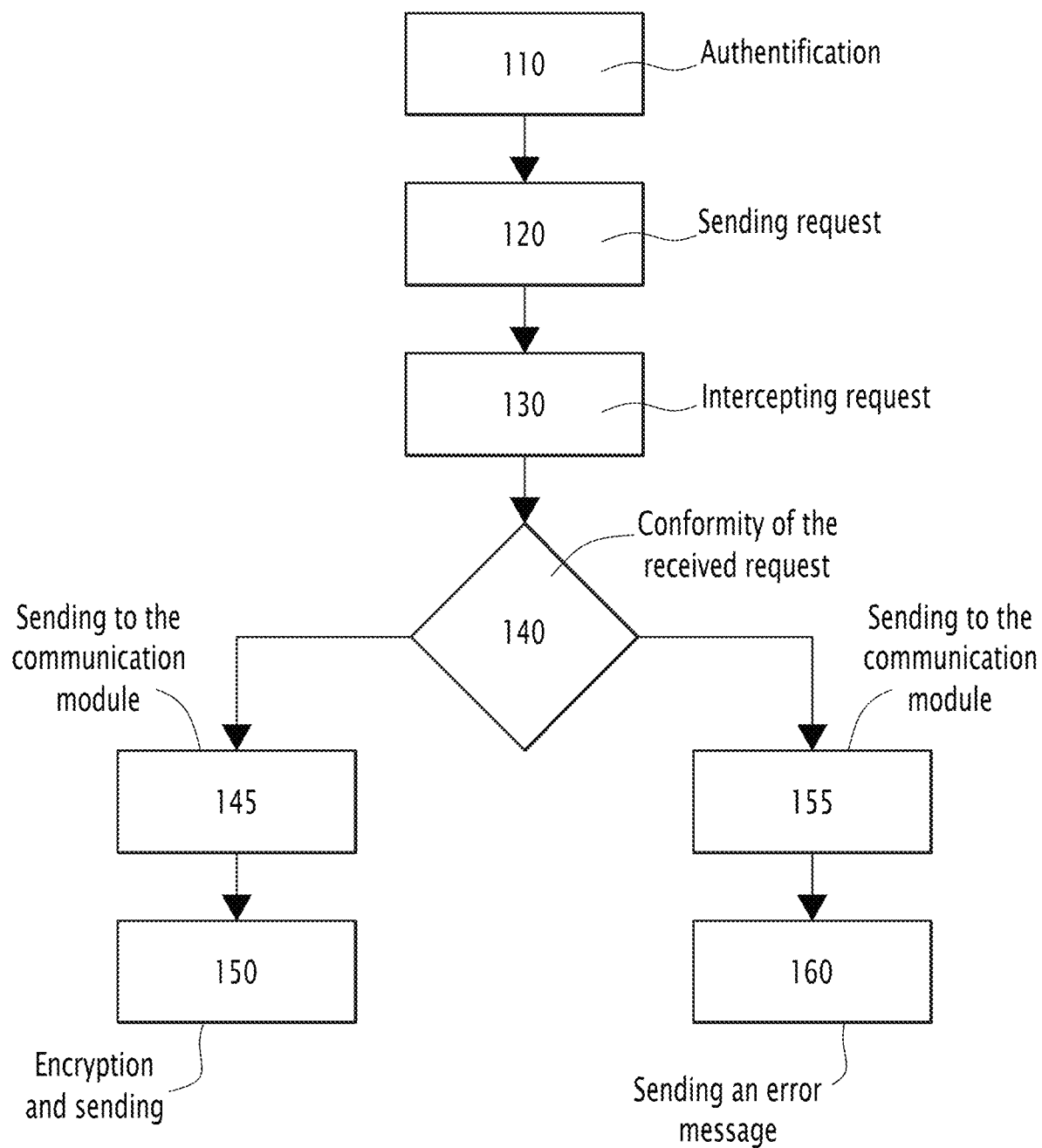
FIG. 3 is a flow chart of a communication method according to the invention, the communication method being implemented by the open world communication device of FIG. 2.

The open world communication device 16 is able to implement a communication method according to the invention which will henceforth be explained with reference to FIG. 3 which shows a flowchart of the steps thereof and with reference to FIG. 4 which illustrates the implementation of such steps.

The initial step 110 corresponds to a step of authenticating the application components 22-1 to 22-N authorized to communicate with the FMS 12.

The step 110 may e.g. be implemented before the aircraft is flown, during the installation of the corresponding application component or during the opening thereof onto the open world communication device 16.

In particular, during this step, the corresponding application component sends an authentication request to the authentication module 32.

Depending on the nature of the application component, the authentication module 32 either authorizes or does not authorize the component to communicate with the FMS 12.

Thereafter, it is considered that each of the application components 22-1 to 22-N is authorized to communicate with the FMS 12.

The following step 120 is implemented when an application component, e.g. the application component 22-1, sends a request to the FMS 12.

This can be performed, e.g., following a corresponding request from the pilot, e.g. during the preparation or modification of a flight plan.

Figure 4:
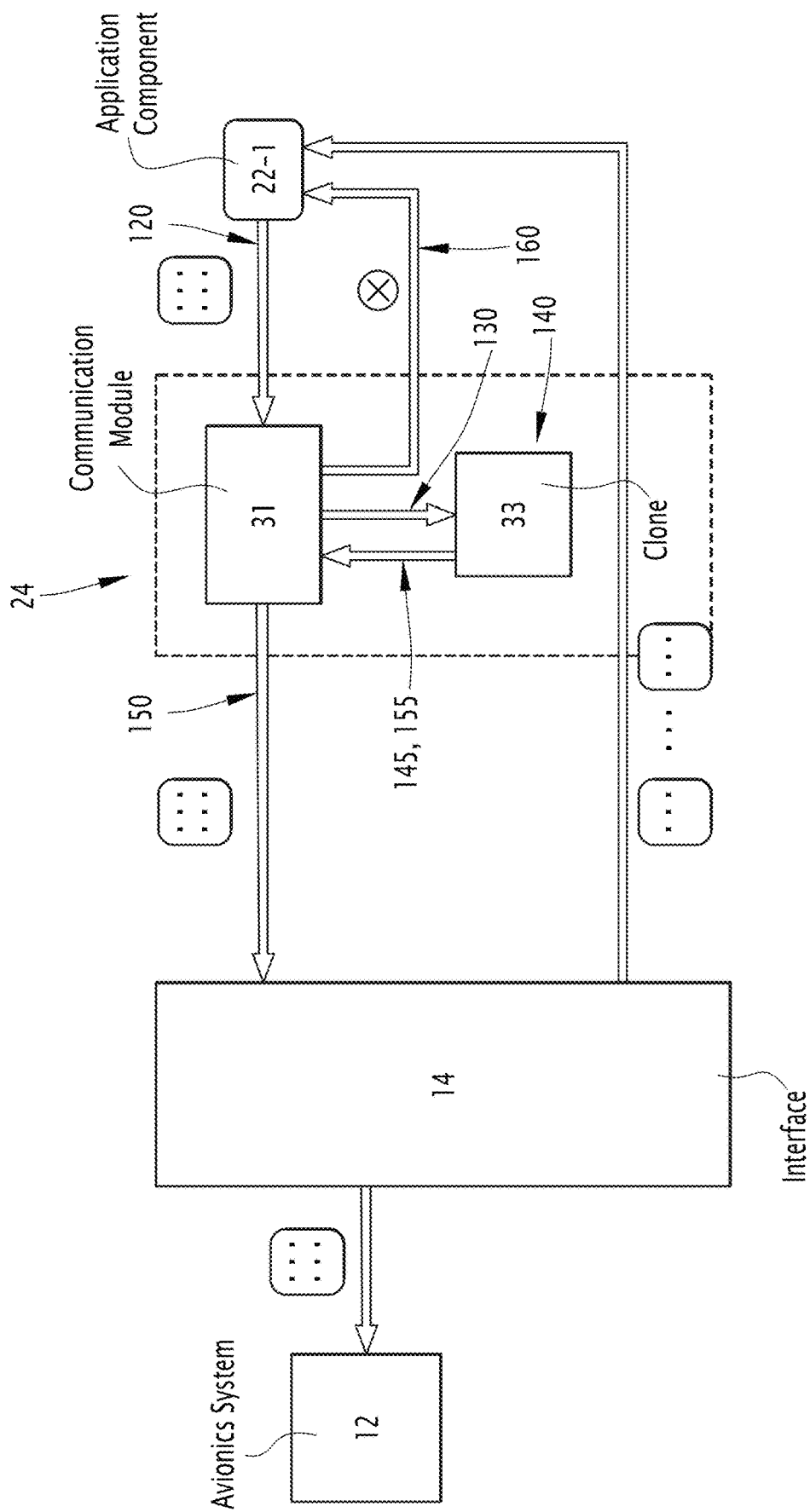
FIG. 4 is a schematic view illustrating the implementation of the communication method of FIG. 3.

Thus, during the step 120, the application component 22-1 sends the corresponding request to the communication module 31, as shown in FIG. 4.

During the next step 130, the communication module 31 intercepts the request sent by the application component 22-1 for sending same to the clone 33.

In the next step 140, the clone 33 determines the conformity of the received request.

To this end, the clone 33 models the execution of the request as the FMS 12 would have done.

The clone 33 next analyzes the result of this execution.

When the execution has led to the normal operation of the FMS, the clone 33 concludes that same is a conforming request and sends, during step 145, the request to the communication module 31 with the conforming status. In such a case, the communication module 31 encrypts the message to be sent to the FMS module 12 and sends same, during step 150, via the interface 14. In other words, the requests are sent, in encrypted form, by the communication module 31 to the FMS module 12.

When the clone 33 considers that the corresponding request has led to abnormal operation of the FMS, e.g. when one of the aforementioned conditions is met, the clone 33 sends, during the step 155, the request with a non-conforming status to the communication module 31. During the next step 160, the communication module 31 then sends an error message to the application component 22-1 which sent the request. The message can be sent e.g. with the corresponding request and/or with a complete report relating to the error.

If appropriate, when the non-conforming status has been associated with a request, the communication module blocks the application component 22-1 which sent the request.

When a request having the conforming status is executed by the FMS 12, the system broadcasts flight management data in the form of a data stream which is e.g. received by all authorized application components. This is done e.g. directly, without control by the interfacing component 24.

The present invention then has a certain number of advantages.

First of all, the invention makes it possible to connect, in a secure manner, an open world device such as e.g. a tablet, to the FMS.

This was made possible by integrating a clone of the FMS directly into the open world device.

Thus, when a request sent by one of the application components of the device poses a risk, the request is intercepted and is not sent to the FMS.

Finally, the invention does not modify the avionics world and in particular, does not modify any component of the FMS by integrating the set of new components into the open world device.

In this way, a particularly simple and easy deployment of the invention using existing hardware components, can be performed.

Of course, other embodiments are further possible.

In particular, it is clear that the invention remains applicable to any avionics system other than the FMS. In such case, the clone integrated into the open world device according to the invention is able to reproduce the operation of such an avionics system. It is therefore clear that all the preceding teachings remain applicable in relation to any avionics system.

The invention claimed is:

1. An open world device for remotely communicating with an avionics system of an aircraft, the open world device comprising:
at least one application processor configured to send requests to the avionics system that remotely communicates with the open world device and to receive data from the avionics system; and
an interface comprising communication circuitry configured to intercept each of the requests sent by the at least one application processor, and
a software-clone of the avionics system configured to test each of the requests intercepted by the communication circuitry in order to determine a status of a respective request of the requests between a conforming status and a non-conforming status, the clone determining the conforming status when the clone determines that execution of the intercepted request would lead to a normal operation of the avionics system, the clone determining the non-conforming status when the clone determines that execution of the intercepted request would lead to one of: (i) an abnormal operation of the avionics system, and (ii) at least one abnormal resultant datum, wherein the communication circuitry is configured to send only requests having the conforming status to the avionics system.

2. The device according to claim 1, wherein the communication circuitry is further configured to send an error message for each of the requests having the non-conforming status to the processor.

3. The device according to claim 1, wherein the interface further comprises an authentication circuitry configured to authenticate the at least one application processor to authorize the at least one application processor to send requests to the avionics system.

4. The device according to claim 1, wherein the data emitted by the avionics system is a data stream which is broadcast by the system, and
wherein the interface is configured to directly send said data stream to the at least one application processor.

5. The device according to claim 1, wherein the communication circuitry is configured to send the corresponding requests to the avionics system in encrypted form.

6. The device according to claim 1, wherein the interface is the only component of the device connected to the avionics system.

7. The device according to claim 1, wherein the interface is an application.

8. The device according to claim 1, wherein the software-clone determines the status of the request as non-conforming when at least one of the following conditions is met, the conditions comprising: a number of requests sent in a predetermined time interval are not compatible with a processing capacity of the clone, a format of the request is not corresponding to an expected format, an execution of the request leads to unexpected data, and the request is not allowed to be executed by the aircraft avionics system without endangering passengers thereof.

9. The device according to claim 1, wherein the communication circuitry is configured to block the at least one application processor when at least one request sent by the at least one application processor has a non-conforming status.

10. The device according to claim 1, wherein the at least one application processor comprising a plurality of application processors, each of the application processors being able to send requests to the avionics system via the interface and to receive data from the avionics system.

11. The device according to claim 1, wherein the avionics system is a flight management system.

12. A communication system for an aircraft, the communication system comprising:
an avionics system; and
an open world device configured to remotely communicate with the avionics system, the open world device comprising:
at least one application processor configured to send requests to the avionics system that remotely communicates with the open world device and to receive data from the avionics system, and an interface comprising communication circuitry configured to intercept each of the requests sent by the at least one application processor, and a software-clone of the avionics system configured to test each of the requests intercepted by the communication circuitry in order to determine a status of a respective request of the requests between a conforming status and a non-conforming status, the clone determining the conforming status when the clone determines that execution of the intercepted request would lead to a normal operation of the avionics system, the clone determining the non-conforming status when the clone determines that execution of the intercepted request would lead to one of: (i) an abnormal operation of the avionics system, and (ii) at least one abnormal resultant datum, wherein the communication circuitry is configured to send only requests having the conforming status to the avionics system.

13. The communication system of claim 12, further comprising an interface connecting the open world device to the avionics system.

14. A method for communicating with an avionics system of an aircraft, implemented by an open world communication device configured to remotely communicate with the avionics system, the open world device including: at least one application processor configured to send requests to the avionics system that remotely communicates with the open world device and to receive data from the avionics system, and an interface including communication circuitry configured to intercept each of the requests sent by the at least one application processor, and a software-clone of the avionics system configured to test each of the requests intercepted by the communication circuitry in order to determine a status of a respective request of the requests between a conforming status and a non-conforming status, the clone determining the conforming status when the clone determines that execution of the intercepted request would lead to a normal operation of the avionics system, the clone determining the non-conforming status when the clone determines that execution of the intercepted request would lead to one of: (i) an abnormal operation of the avionics system, and (ii) at least one abnormal resultant datum, the communication circuitry being configured to send only requests having the conforming status to the avionics system, the method comprising:

generating the request intended for the avionics system;
intercepting said request;
testing said request intercepted by the communication circuitry to determine the status of the request between the conforming status and the non-conforming status; and when said request has the conforming status, sending the request to the avionics system.

15. The device according to claim 2, wherein the interface further comprises an authentication circuitry configured to authenticate the at least one application processor to authorize the at least one application processor to send requests to the avionics system.

16. The device according to claim 2, wherein the data emitted by the avionics system is a data stream which is broadcast by the system, and
wherein the interface is configured to directly send said data stream to the at least one application processor.

17. The device according to claim 3, wherein the data emitted by the avionics system is a data stream which is broadcast by the system, and
wherein the interface is configured to directly send said data stream to the at least one application processor.

18. The device according to claim 2, wherein the communication circuitry is configured to send the corresponding requests to the avionics system in encrypted form.

19. The device according to claim 3, wherein the communication circuitry is configured to send the corresponding requests to the avionics system in encrypted form.

* * * * *